(12) United States Patent
Hamabe et al.

(10) Patent No.: US 9,694,382 B2
(45) Date of Patent: Jul. 4, 2017

(54) MANUFACTURING APPARATUS OF COATING FILM PRODUCT

(71) Applicant: Panasonic Intellectual Property Management Co., Ltd., Osaka (JP)

(72) Inventors: Masashi Hamabe, Osaka (JP); Takao Kuromiya, Osaka (JP); Takashi Tsuruta, Osaka (JP); Masateru Mikami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 126 days.

(21) Appl. No.: 14/583,278

(22) Filed: Dec. 26, 2014

(65) Prior Publication Data

US 2015/0224529 A1 Aug. 13, 2015

(30) Foreign Application Priority Data

Feb. 10, 2014 (JP) .................................. 2014-023630
Sep. 26, 2014 (JP) .................................. 2014-196309

(51) Int. Cl.
*B05C 1/08* (2006.01)
*B05C 13/00* (2006.01)
(Continued)

(52) U.S. Cl.
CPC ................ *B05C 13/00* (2013.01); *B05C 1/08* (2013.01); *B05C 1/083* (2013.01); *B05C 1/086* (2013.01); *B05C 1/0808* (2013.01); *B05C 1/0826* (2013.01); *B05C 1/0834* (2013.01); *B05C 1/0865* (2013.01); *B05C 1/0869* (2013.01); *B05C 11/025* (2013.01); *H01M 4/0404* (2013.01); *H01M 4/0435* (2013.01); *H01M 10/052* (2013.01)

(58) Field of Classification Search
CPC ......... B05C 1/08; B05C 1/0826; B05C 1/083; B05C 1/0834; B05C 1/086; B05C 11/025; G03G 15/08
USPC .......... 399/286, 331; 492/28, 37, 17, 56, 59; 118/100–263
See application file for complete search history.

(56) References Cited

U.S. PATENT DOCUMENTS 5,937,255 A * 8/1999 Kagawa ............. G03G 15/2025
399/324
7,447,474 B2 * 11/2008 Fujino .................. G03G 15/206
399/329
(Continued)

FOREIGN PATENT DOCUMENTS

EP 2664580 * 8/2012
JP 11167270 * 6/1999
(Continued)

*Primary Examiner* — Laura Edwards
(74) *Attorney, Agent, or Firm* — Panasonic IP Management; Kerry S. Culpepper (57) ABSTRACT

A manufacturing apparatus of a coating film product rolls a mixture coating material by a first roll and transfers the mixture coating material to a coated object in motion to thereby manufacture the coating film product. An arithmetic average roughness Ra on a roll surface of the first roll is higher than a value 0.05 times of a particle size "d10" in which an integrated distribution of particle sizes of particles included in the mixture coating material is 10% and lower than a value 20 times a particle size "d90" in which an integrated distribution is 90%.

1 Claim, 7 Drawing Sheets (51) Int. Cl.
*B05C 11/02* (2006.01)
*H01M 4/04* (2006.01)
*H01M 10/052* (2010.01)

(56) References Cited

U.S. PATENT DOCUMENTS

| | | | | |
|---|---|---|---|---|
| 8,137,788 | B2* | 3/2012 | Takada | C08J 7/047 |
| | | | | 428/141 |
| 8,328,705 | B2* | 12/2012 | Kurisu | C21D 9/56 |
| | | | | 492/53 |
| 2003/0077437 | A1* | 4/2003 | Nakamura | B82Y 20/00 |
| | | | | 428/327 |
| 2004/0182695 | A1 | 9/2004 | Bulan et al. | |
| 2006/0051540 | A1* | 3/2006 | Kagawa | B29C 47/06 |
| | | | | 428/35.7 |
| 2009/0003863 | A1* | 1/2009 | Hagiwara | G03G 15/0808 |
| | | | | 399/58 |
| 2009/0240047 | A1* | 9/2009 | Noritsune | B29C 43/222 |
| | | | | 536/56 |

FOREIGN PATENT DOCUMENTS

| | | |
|---|---|---|
| JP | 2001-230158 | 8/2001 |
| JP | 2005-505692 | 2/2005 |
| JP | 2010-171366 | 8/2010 |

* cited by examiner

Related Art

FIG. 10

Related Art

MANUFACTURING APPARATUS OF COATING FILM PRODUCT

CROSS-REFERENCE TO RELATED APPLICATIONS

The present application claims the benefit of foreign priority of Japanese patent applications 2014-023630 filed on Feb. 10, 2014 and 2014-196309 filed on Sep. 26, 2014, the contents both of which are incorporated herein by reference.

BACKGROUND

1. Technical Field

The technical field relates to a manufacturing apparatus for manufacturing a coating film product by transferring a coating film material to a coated object in motion.

2. Description of Related Art

Demands for electrochemical devices such as a lithium ion battery, which has high energy density, is light weight, and can be recharged and discharged repeatedly without memory effect, and an electric-double layered capacitor, which has an excellent charge and discharge cycle life, are rapidly increasing because of their characteristics.

The lithium ion secondary battery is used in fields of a cellular phone, a notebook personal computer and so on due to its relatively high energy density, small size and light weight. The electric-double layered capacitor is used as a memory-backup small power supply for a personal computer and the like because it can be charged and discharged rapidly and has an excellent charge and discharge cycle life.

These electrochemical devices are expected to be applied to a large-sized power supply such as, for example, for an electric car.

As applications are becoming multifunctional in recent years, for example, installation on electronic devices, communication devices and cars, further output enhancement, capacity enhancement and improvement of mechanical characteristics are increasingly required of these electrochemical devices.

In order to improve the performance of the electrochemical device, a method of forming an electrode for the electrochemical device has been improved in various aspects.

The electrode for the electrochemical device can be obtained, for example, by forming an electrode material containing an electrode-active substance and so on in a sheet shape and by crimping the sheet-like electrode composition layer onto a current collector.

It is necessary to form the electrode-active substance in high density for enhancing the capacity of the electrode for the electrochemical device.

SUMMARY

A manufacturing method of a related-art coating film product will be explained more specifically with reference to FIG. 9 and FIG. 10.

Figure 9:
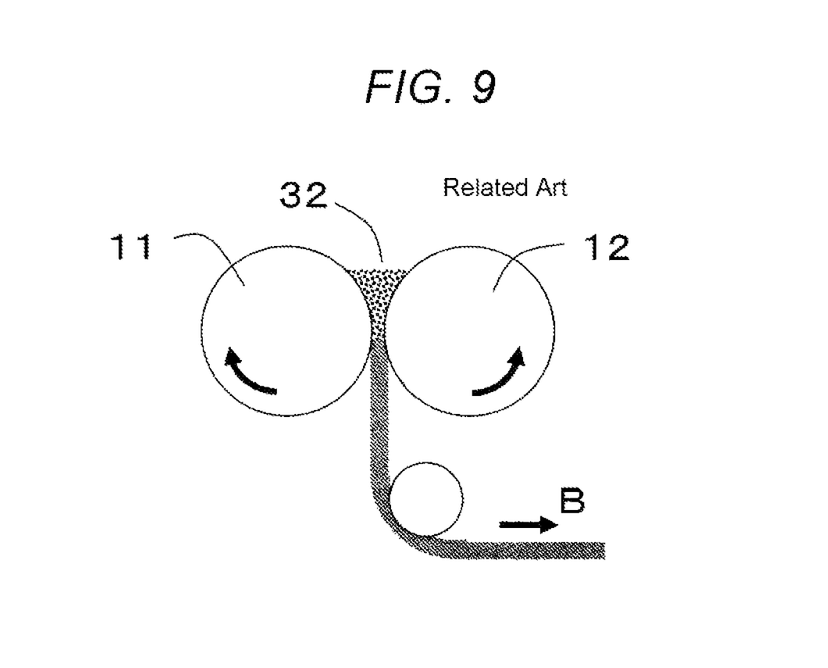
FIG. 9 is a schematic partial cross-sectional view (No. 1) of a related-art manufacturing apparatus of a coating film product.
Figure 10:
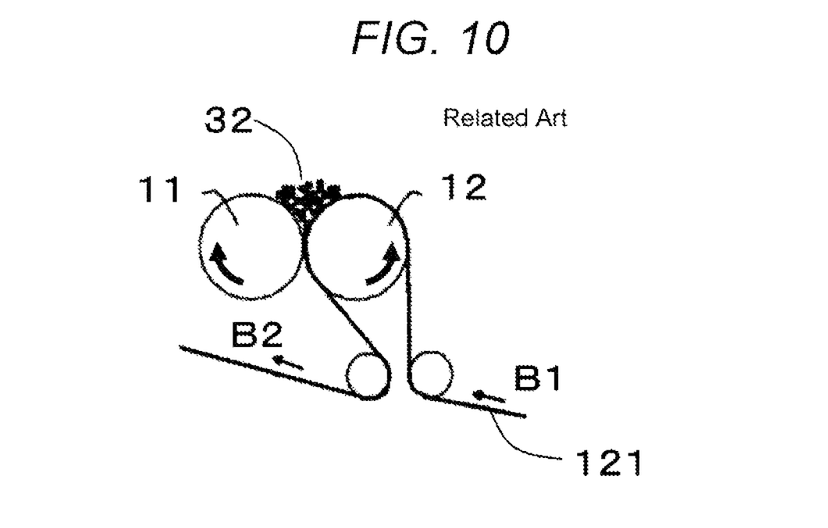
FIG. 10 is a schematic partial cross-sectional view (No. 2) of a related-art manufacturing apparatus of the coating film product.

Here, FIG. 9 and FIG. 10 are schematic partial cross-sectional views (No. 1 and No. 2) of a related-art manufacturing apparatus of the coating film product.

First, one known method for obtaining a high-density sheet-like molded body includes preparing a kneaded material by mixing and kneading raw materials including fine carbon powder, a conductive auxiliary and binder, and processing the kneaded material into the sheet-like molded body with a given thickness by roll pressing (for example, refer to JP-A-2001-230158 (Patent Document 1)).

In the above method, as shown in FIG. 9, the forming of a film for coating is performed by supplying a dry powder coating material 32 between a first roll 11 and a second roll 12, and the molded body is fed to a direction of an arrow B and wound, then, transferred onto the current collector.

A manufacturing apparatus storing the kneaded material in a space formed by dividers and press-molding the kneaded material by a pair of rolls to obtain the sheet-like molded body is used, thereby improving the density of the fine carbon powder and enhancing the capacity.

Next, another known method of manufacturing a sheet for an electrochemical device electrode includes forming an electrode composition layer on the surface of a support by a drying method and by peeling the support from the electrode composition layer after crimping the electrode composition layer to a current collector (for example, refer to JP-A-2010-171366 (Patent Document 2)).

Also in the above method, the forming of the film for coating is performed by supplying the dry powder coating material 32 between the first roll 11 and the second roll 12 as shown in FIG. 10, and molded bodies formed on a roughening support 121 such as a film are fed in directions of arrows B1 and B2 and wound with the roughening support 121, then, transferred onto the current collector.

However, it is difficult to realize mass production of the uniform coating film product with sufficiently high production efficiency in the related-art manufacturing method of the coating film product.

In the former manufacturing method of the coating film product, it is not easy to form a film by a wet coating material containing a solvent, and the strength of the sheet-like molded body is low. Further, it is difficult to form the long molded body to be wound by the roll; therefore, the production efficiency is not sufficiently high.

In the latter manufacturing method of the coating film product, it is not easy to form a film by a wet coating material containing a solvent. Further, it is necessary to perform a process of forming the coating material coated by the rolls through the support on the current collector as the electrode composition layer; therefore, the production efficiency is not sufficiently high.

It is possible to consider a method in which a wet coating material including an electrode composition and so on which does not require the drying process is rolled between two rolls to form the coating film instead of using the dry powder coating material, and the formed coating film is directly transferred to the current collector as the electrode composition layer, however, the coating material tends to remain on the roll surface, and a transfer property and smoothness of the coating film product become worse in the event, therefore, it is not easy to form the uniform coating film product.

In view of the above problems, as well as other concerns, a manufacturing apparatus of a coating film product according to various embodiments discussed herein is capable of realizing mass production of the uniform coating film product with higher production efficiency.

According to an embodiment, a manufacturing apparatus of a coating film product rolls a coating film material by using a roll and transfers the coating film material to a moving coated object to thereby manufacture the coating film product, in which an arithmetic average roughness Ra on a roll surface of the roll is higher than a value 0.05 times of a particle size "d10" of particles included in the coating film material, in which an integrated distribution of particle sizes is 10%, as well as smaller than a value 20 times of a particle size "d90", in which an integrated distribution of particle sizes is 90%.

In the manufacturing apparatus of the coating film product, an average length of roughness curve factors RSm on the roll surface may be smaller than a value 15 times of the particle size "d90" in which the integrated distribution of particle sizes of particles included in the coating film material is 90%.

In the manufacturing apparatus of the coating film product, an arithmetic average roughness Ra at arbitrary one point on the roll surface may be smaller than an arithmetic average roughness Ra at another arbitrary point on the roll surface existing at an outer side of the one arbitrary point with respect to the roll axis direction.

In the manufacturing apparatus of the coating film product, an arithmetic average roughness Ra at arbitrary one point on the roll surface within a given range in accordance with a width of the coated object with respect to a direction orthogonal to a travelling direction may be smaller than an arithmetic average roughness Ra at another arbitrary point on the roll surface outside the given range.

In the manufacturing apparatus of the coating film product, an arithmetic average roughness Ra with respect to a roll circumferential direction on the roll surface may be smaller than an arithmetic average roughness Ra with respect to a roll axis direction on the roll surface.

In the manufacturing apparatus of the coating film product, plural rolls may be provided, and roll rotation directions of adjacent rolls in the plural rolls may differ from each other.

In the manufacturing apparatus of the coating film product, plural rolls may be provided, and roll peripheral velocities of adjacent rolls in the plural rolls may differ from each other.

In the manufacturing apparatus of the coating film product, a volume water content of the coating film material may be 20 volume % or more to 65 volumes or less.

In the manufacturing apparatus of the coating film product, the roll surface may be roughened, and a water contact angle on the roll surface before being roughened may be 90 degrees or more.

Accordingly, it is possible to provide a manufacturing apparatus of a coating film product capable of realizing mass production of the uniform coating film product with higher production efficiency.

DESCRIPTION OF EMBODIMENTS

Hereinafter, exemplary embodiments of a manufacturing apparatus of a coating film product will be explained in detail with reference to the drawings.

Embodiment

First, a structure and operations of a manufacturing apparatus of a coating film product 23 according to an embodiment will be explained with reference to FIG. 1.

Figure 1:
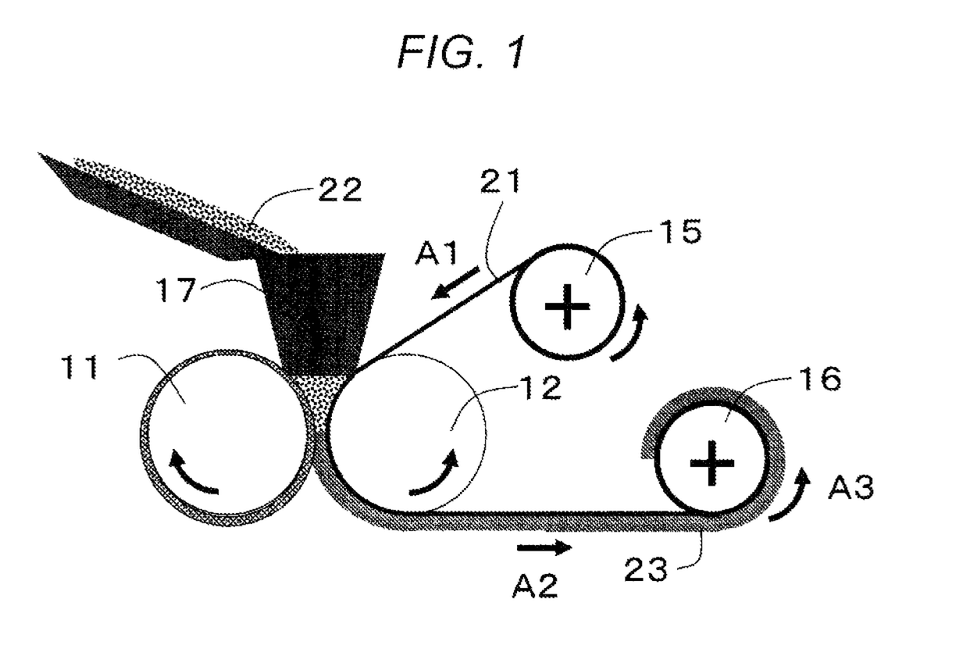
FIG. 1 is a schematic cross-sectional view of a manufacturing apparatus of a coating film product according to an exemplary embodiment.

Here, FIG. 1 is a schematic cross-sectional view of the manufacturing apparatus of the coating film product 23 according to the embodiment.

A mixture coating material 22 is supplied to a gap between a first roll 11 and a second roll 12 through a coating material supply hopper 17 installed above a place between the first roll 11 and the second roll 12.

A coated object 21 carried along a direction of an arrow A1 from an unwind machine 15 is moved on an upper surface of the second roll 12 along a direction of an arrow A2, and the mixture coating material 22 is transferred in a coating film state between the first roll 11 and the second roll 12.

The coating film product 23 in which the mixture coating material 22 is transferred in the coating film state is wound by a winding machine 16 along a direction of an arrow A3.

Note that post-processes such as a pressing process, a drying process, a peeling process, a slitting process and the like may be performed before the coating film product 23 is wound by the winding machine 16 if necessary.

The next processes such as a laminating process, an assembly process and the like may be performed immediately without winding the coating film product 23 by the winding machine 16.

Next, the structure and operations of the manufacturing apparatus of the coating film product 23 according to the embodiment will be explained more specifically with reference to FIG. 2.

Figure 2:
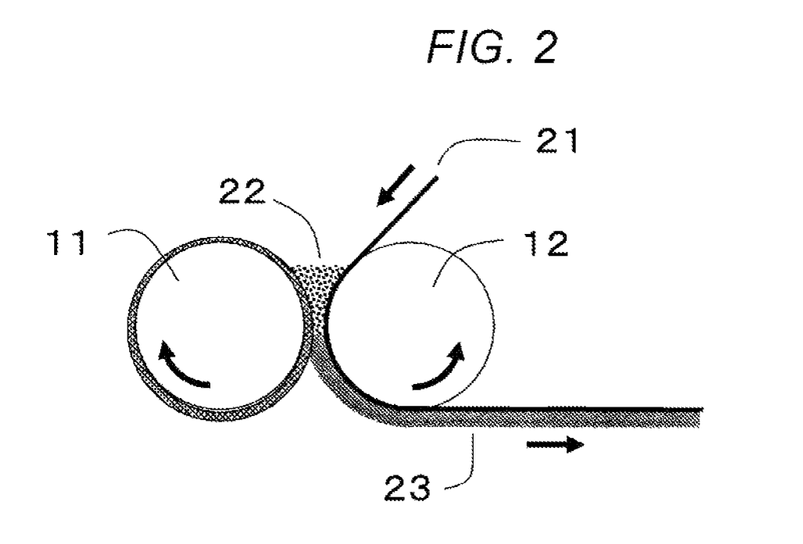
FIG. 2 is a schematic partial cross-sectional view (No. 1) of the manufacturing apparatus of the coating film product according to the exemplary embodiment.

Here, FIG. 2 is a schematic partial cross-sectional view (No. 1) of the manufacturing apparatus of the coating film product 23 according to the embodiment.

The mixture coating material 22 enters between the first roll 11 and the second roll 12 rotating in a roll rotation direction inverse to a roll rotation direction of the first roll 11.

The coated object 21 is moved between the first roll 11 and the second roll 12 at a velocity equal to a roll peripheral velocity of the second roll 12 along the direction of the roll rotation direction of the second roll 12.

The mixture coating material 22 entering between the first roll 11 and the second roll 12 is transferred in a coating film state onto the coated object 21 which is moving.

Then, the coating film product 23 in which the mixture coating material 22 is transferred onto the coated object 21 in the coating film state is carried for receiving post-processes such as the pressing process, the drying process, the peeling process.

A material of the first roll 11 and the second roll 12 is preferably SUS (Steel Use Stainless) and the like having enough rigidity so as not to be adversely affected even in a case where the rigidity of the mixture coating material 22 fluctuates to some degree.

It is preferable that the surface of the first roll 11 is coated with a material having an excellent transfer property and so on.

The surface of the first roll 11 is preferably coated with, for example, (1) polymer materials such as urethane rubber, silicone rubber, fluororubber, chloroprene rubber, nitrile rubber, butyl rubber, PTFE (Polytetrafluoroethylene) sintered body, fluororesin, silicone resin and PEEK (Polyether ether ketone) resin, (2) inorganic materials such as alumina, silica, titania, nickel, chromium, chromium nitride, zirconia, zinc oxide, magnesia, tungsten carbide, DLC (Diamond like carbon) and diamond, (3) metal materials, (4) composite compound materials, (5) fluorine compounds and soon. From the viewpoint of the abrasion property, inorganic materials, metal materials and composite compound materials of the inorganic material and the metal material or fluorine compounds are preferably used.

Other materials besides the above materials may be used as long as such materials have an excellent transfer property.

Then, surface treatments by (1) thermal spraying processing, (2) impregnated coating of fluororesin, silicone resin and so on or (3) plating and so on may be performed.

Furthermore, the above materials and the surface treatments can be used by itself as well as can be used by mixing or combining them according to need.

Next, processes in which the mixture coating material 22 is supplied to the first roll 11, the second roll 12 and the coated object 21 to thereby form the coating film product 23 will be explained more specifically mainly with reference to FIG. 3.

Figure 3:
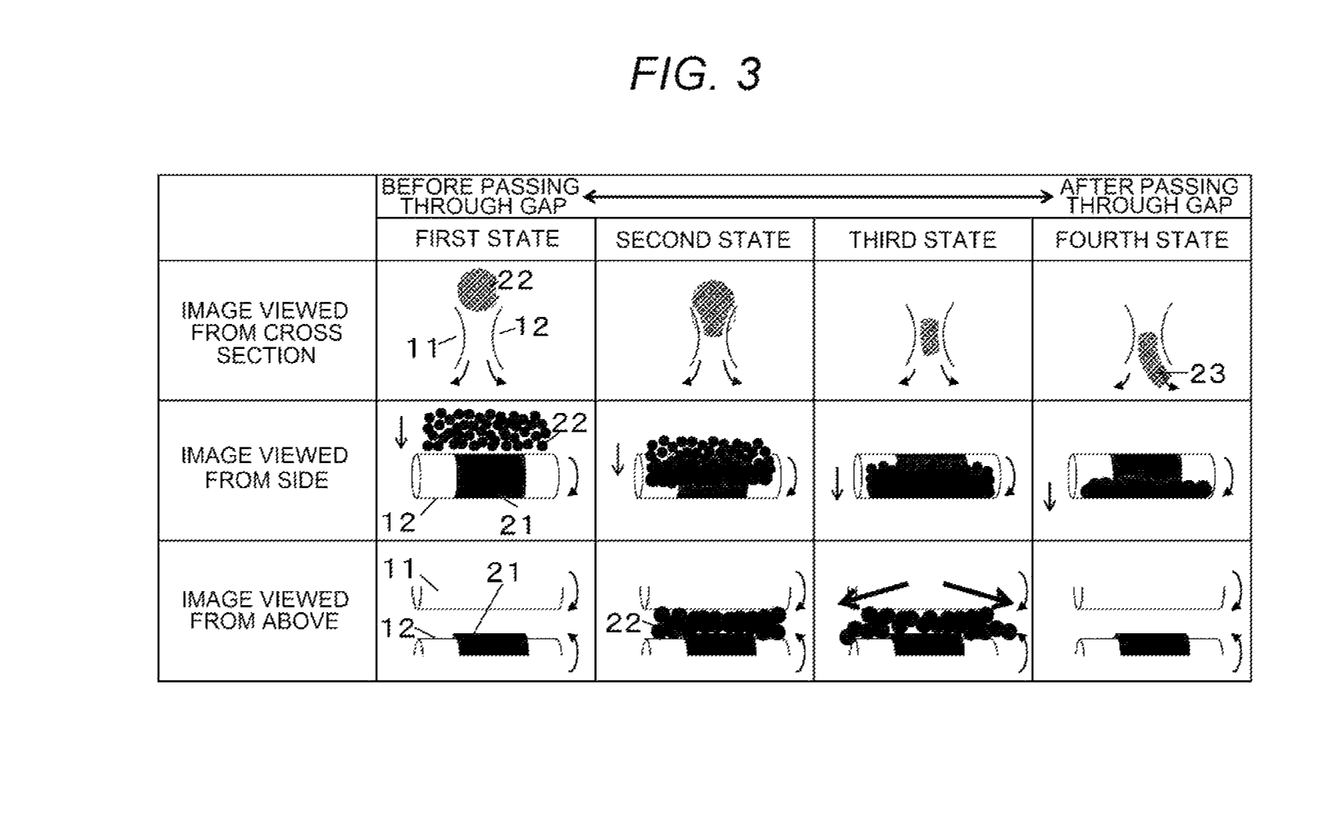
FIG. 3 is an explanatory view (No. 1) for explaining operations of the manufacturing apparatus of the coating film product according to the exemplary embodiment.

Here, FIG. 3 is an explanatory view (No. 1) for explaining operations of the manufacturing apparatus of the coating film product 23 according to the embodiment.

First, in a first state before passing through the gap, the mixture coating material 22 is supplied between the first roll 11 and the coated object 21 which is moving on the upper surface of the second roll 12 from right above the first roll 11 and the second roll 12.

As a method of supplying the mixture coating material 22, it is preferable to supply a method not causing phenomena such as bridging and rathole in which the coating material does not move between the rolls, so that quantitative and fluid supply can be realized. More specifically, a feeder such as a vibrating feeder, a screw feeder, a rotary feeder, a roll feeder, a belt feeder or an apron feeder is preferably used.

Next, in a second state, the mixture coating material 22 is fed to the gap between rolls by rotations of the first roll 11 and the second roll 12.

The mixture coating material 22 is rolled while being fed to the gap between the rolls, which is on the coated object 21, thereby forming the coating film after passing through the narrowest place of the gap.

The gap is formed to have a uniform size with respect to a roll axis direction, thereby obtaining the coating film product 23 which is uniform with respect to the roll axis direction.

The thickness of the coating film can be changed freely by changing the size of the gap.

Next, in a third state, almost all the formed coating film is transferred from the first rolls 11 to the coated object 21 on the upper surface of the second rolls 12.

This is because releasing can be easily performed by a later-described roughening treatment.

Then, in a fourth state after passing through the gap, the coating film product 23 is formed.

As the mixture coating material 22 hardly remains on the first roll 11, the coating film product 23 can be continuously formed in the next process after the first roll rotates once.

Figure 4:
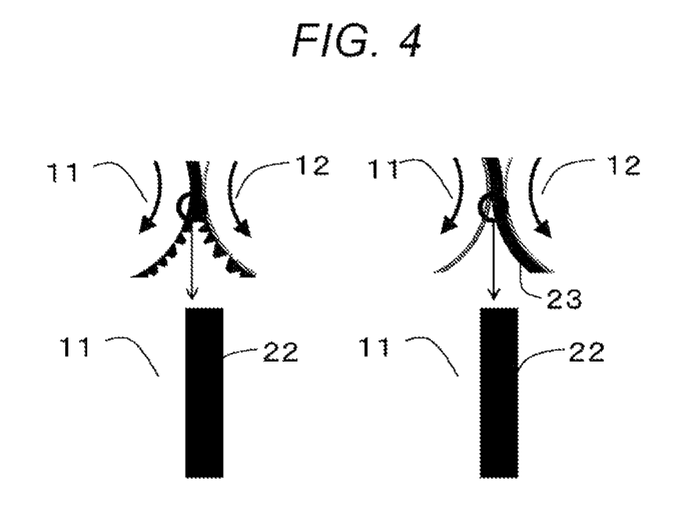
FIG. 4 is an explanatory view (No. 2) for explaining operations of the manufacturing apparatus of the coating film product according to the exemplary embodiment.

As shown in FIG. 4, when the surface of the first roll 11 is roughened, the formed coating film can be easily transferred from the first roll 11 to the coated object 21 on the upper surface of the second roll 12.

Here, FIG. 4 is an explanatory view (No. 2) for explaining operations of the manufacturing apparatus of the coating film product 23 according to the embodiment.

In FIG. 4, the left side indicates a case where the surface of the first roll 11 is not roughened, a contact area between the mixture coating material 22 and the surface of the first roll 11 is large and the transfer property is not good, and the right side indicates a case where the surface of the first roll 11 is roughened, the contact area between the mixture coating material 22 and the surface of the first roll 11 is small and the transfer property is good.

In the lower side of the drawing, portions surrounded by small circles in the upper side of the drawing are shown in an enlarged scale.

When the surface of the first roll 11 is roughened, the contact area between the mixture coating material 22 and the surface of the first roll 11 tends to be small and the adhesion of the mixture coating material 22 with respect to the surface of the first roll 11 is reduced, as a result, the mixture coating material 22 hardly remains on the surface of the first roll 11 as compared with the case where the surface of the first roll 11 is not roughened.

For example, in order to transfer almost all the coating film from the first roll 11 to the coated object 21, the degree of surface roughening on the surface of the first roll 11 is preferably adjusted so that the contact area between the coating material to be used and the surface of the first roll 11 is smaller than a contact area in the case of the mirror surface in which an arithmetic average roughness Ra on the roll surface is 0.05 µm or less.

Though the contact area between the mixture coating material 22 and the surface of the first roll 11 tends to be small when the surface of the first roll 11 is roughened as described above, the contact area may be increased when the degree of surface roughening is increased too much.

This is because the coating material bites into depressions on the surface of the first roll 11 when the degree of surface roughening is increased too much.

The present inventors have noticed that it is effective that the degree of surface roughening is adjusted for improving the transfer property from the roll to the base material and obtaining the uniform coating film product 23.

Then, the present inventors have changed the degree of surface roughening by simulations and have found that the contact area is suppressed to be small in the case where the arithmetic average roughness Ra on the roll surface is higher than a value 0.05 times of a particle size "d10" in which an integrated distribution of particle sizes of particles included in the mixture coating material 22 is 10% as well as smaller than a value 20 times of a particle size "d90" in which an integrated distribution of particle sizes of particles included in the mixture coating material 22 is 90%, and that the contact area is further suppressed to be small in the case where an average length of roughness curve factors RSm on the roll surface is smaller than a value 15 times of the particle size "d90" in which the integrated distribution is 90%.

The above will be explained more specifically as follows.

The lower limit of surface roughening is prescribed by the particle size "d10" in which the integrated distribution of the coating material measured by using a particle size distribution meter is 10% and the arithmetic average roughness Ra on the roll surface. In order to reduce the contact area to be smaller than the case of the mirror surface, it is preferable that the following relational expression is satisfied.

$$d10 \times 0.05 < Ra \quad \text{(Expression 1)}$$

The upper limit of surface roughening is prescribed by the particle size "d90" in which the integrated distribution of the coating material measured by using the particle size distribution meter is 90% and the arithmetic average roughness Ra on the roll surface. In order to reduce the contact area to be smaller than the case of the mirror surface, it is preferable that the following relational expression is satisfied.

$$Ra < d90 \times 20 \quad \text{(Expression 2)}$$

In order to further reduce the contact area, the roughness is prescribed by the average length of roughness curve factors RSm on the roll surface, and it is preferable that the following relational expression is satisfied.

$$RSm < d90 \times 15 \quad \text{(Expression 3)}$$

The arithmetic average roughness Ra and the average length of roughness curve factors RSm can be calculated by evaluating a roughness curve obtained by removing a surface waviness component longer than a given wavelength from a profile curve included in a cross section.

The arithmetic average roughness Ra is a value obtained by extracting a partial roughness curve having a reference length with respect to a direction of a height reference line from the roughness curve and folding the curve to the upper side of the height reference line, then, dividing the area of a figure surrounded by the folded partial roughness curve and the height reference line by the reference line.

The average length of roughness curve factors RSm is a value obtained by extracting the partial roughness curve having the reference length with respect to the direction of the height reference line from the roughness curve and calculating a sum of lengths of height reference lines between peaks and troughs which correspond to peaks of the partial roughness curve and adjacent troughs, then, averaging these sums.

Accordingly, the arithmetic average roughness Ra and the average length of roughness curve factors RSm can be calculated by setting a direction of and the reference length of an average line included in the cross section according to an object concerning an arbitrary point on the surface.

Incidentally, when the mixture coating material 22 enters the gap between the first roll 11 and the second roll 12 uniformly with respect to the roll axis direction, the uniform coating film product 23 with small variation in film thickness with respect to the roll axis direction can be obtained.

However, as the gap size between the first roll 11 and the second roll 12 is reduced particularly in a place where the coated object 21 exists in the roll central portion with respect to the roll axis direction, the coating material tends to flow to roll end portions on the outer sides in the above-described third state (refer to FIG. 3). Accordingly, the rate of entry of the material in the roll central portion tends to be smaller than the rate of entry of the material in the roll end portions.

Therefore, in order to allow the rate of entry of the material to be uniform with respect to the roll axis direction, it is preferable that the degree of surface roughening in the roll end portions is larger than the degree of surface roughening in the roll central portion by changing the roughness on the roll surface in the first roll 11 with respect to the roll axis direction so that the material hardly enters the roll end portions.

That is, when an arithmetic average roughness Ra at arbitrary one point on the roll surface is smaller than an arithmetic average roughness Ra at another arbitrary point on the roll surface existing at an outer side of the one arbitrary point with respect to the roll axis direction, preferable effects can be obtained.

Needless to say, when an arithmetic average roughness Ra at arbitrary one point on the roll surface within a given range in accordance with a width of the coated object 21 is smaller than an arithmetic average roughness Ra at another arbitrary point on the roll surface outside the given range, sufficient effects can be obtained in many cases.

In the degree of surface roughening, it is preferable that a component of a roll circumferential direction is smaller than a component of the roll axis direction.

When the component of the roll circumferential direction is small, the entry property of the material is increased, and when the component of the roll axis direction is large, the movement of the material with respect to the roll axis direction is suppressed and the entry variation of the material with respect to the roll axis direction is reduced, therefore, it is possible to transfer the coating film from the first roll 11 to the coated object 21 more easily.

That is, when the degree of surface roughening with respect to the roll axis direction is changed so that the roll central portion is smoother than the roll end portions in the first roll 11, the mixture coating material 22 enters the gap between the first roll 11 and the second roll 12 uniformly with respect to the roll axis direction, therefore, the uniform coating film product 23 can be obtained in the above-described fourth state (refer to FIG. 3), and the continuous coating film product 23 can be obtained by continuously inputting the mixture coating material 22.

Incidentally, when the adhesion of the coating material to the first roll 11 is high, the coating film may be difficult to be transferred from the first roll 11, and when the adhesion between coating materials is low, the coating film may be split.

That is, in the material with a poor transfer property, it may be difficult to form the mixture coating material 22 in the coating film state due to the above defects.

Accordingly, in order to obtain a given mixture mass of an electrode plate (g/m$^2$), it is preferable that the gap between the first roll 11 and the second roll 12 is adjusted or that a roll peripheral velocity ratio between the first roll 11 and the second roll 12 is adjusted.

Figure 5:
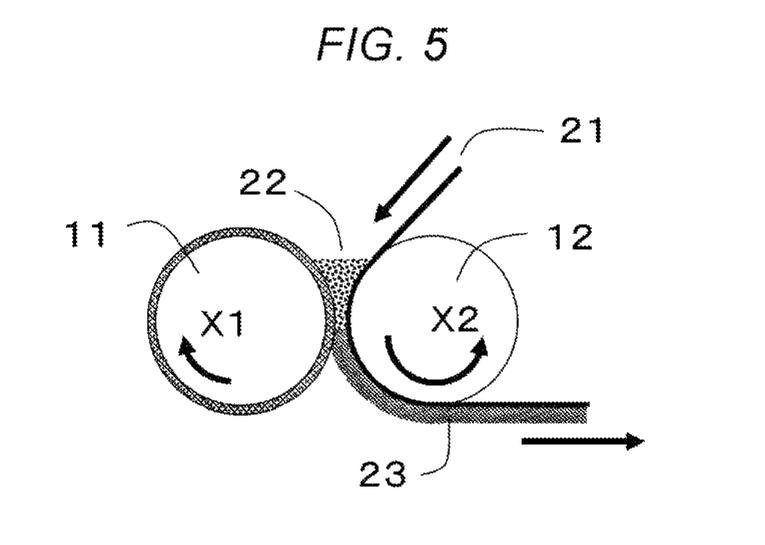
FIG. 5 is a schematic partial cross-sectional view (No. 2) of the manufacturing apparatus of the coating film product according to the exemplary embodiment.

As shown in FIG. 5, for example, in order to obtain a better transfer property, the roll rotation direction and the roll peripheral velocity concerning the adjacent first roll 11 and the second roll 12 are preferably different from each other.

Here, FIG. 5 is a schematic partial cross-sectional view (No. 2) of the manufacturing apparatus of the coating film product 23 according to the embodiment.

FIG. 5 shows a case where the roll peripheral velocity ratio (roll peripheral velocity of the second roll 12)/(roll peripheral velocity of the first roll 11) is higher than "1".

An arrow X1 denoting the roll peripheral velocity of the first roll 11 and an arrow X2 denoting the roll peripheral velocity of the second roll 12 are shown so that the arrow X2 denoting the roll peripheral velocity of the second roll 12 is longer than the arrow X1 denoting the roll peripheral velocity of the first roll 11.

In the case where the roll peripheral velocity ratio (roll peripheral velocity of the second roll 12)/(roll peripheral velocity of the first roll 11) is lower than "1", it may be difficult to transfer the mixture coating material 22 in the coating film state to the coated object 21 from the first roll 11.

In the state where the mixture coating material 22 is transferred to the coated object 21 from the first roll 11, there is little adverse effect even when the roll peripheral velocity ratio (roll peripheral velocity of the second roll 12)/(roll peripheral velocity of the first roll 11) is considerably high, however, the roll peripheral velocity ratio is preferably 30 or less for obtaining a further uniform film thickness.

Furthermore, concerning a volume water concentration of the mixture coating material 22 to be supplied to the gap between the first roll 11 and the second roll 12, a volume water content is preferably 20 volume % or more to 65 volume % or less.

When the volume water content is 20 volume % or more to 65 volume or less, a solvent exists only on particle surfaces or in the vicinity thereof in the coating material, therefore, the mixture coating material 22 does not have fluidity, and can be formed in the coating film state.

As the fluidity is generated when the volume water content is higher than 65 volume %, the mixture coating material 22 tends to adhere to both the first roll 11 and the coated object 21.

When the volume water content is lower than 20 volume, it may difficult to form the mixture coating material 22 in the coating film state as spaces between particles of the mixture coating material 22 are hardly covered with the solvent.

Additionally, a water contact angle on the roll surface before being roughened is preferably 90 degrees or more so as to reduce surface energy on the roll surface and to obtain water repellency.

Figure 6:
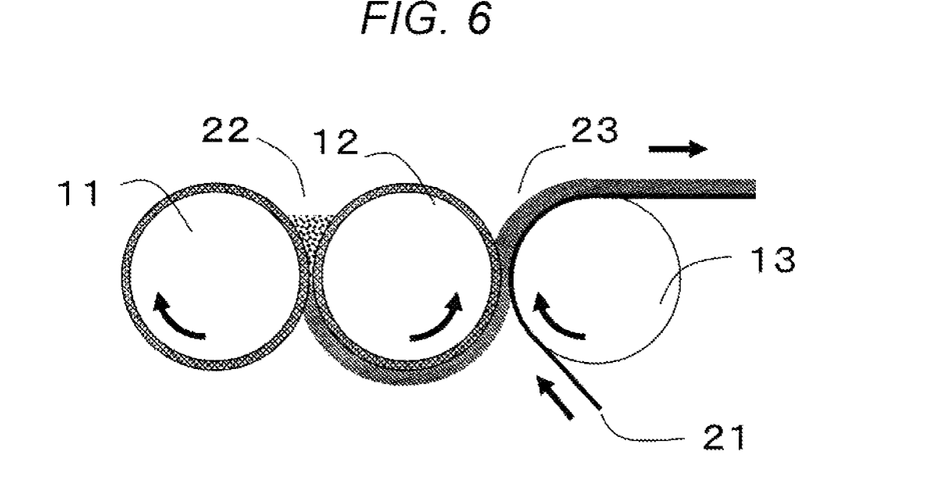
FIG. 6 is a schematic partial cross-sectional view of a manufacturing apparatus of the coating film product according to another exemplary embodiment.

Alternatively, it may be preferable that rather than the mixture coating material 22 be directly transferred to the coated object 21, that the coating film is first formed on the surface of the second roll 12 and then transferred on the coated object 21 as shown in FIG. 6.

Here, FIG. 6 is a schematic partial cross-sectional view of a manufacturing apparatus of the coating film product 23 according to another embodiment.

The mixture coating material 22 enters the gap between the first roll 11 and the second roll 12, and the coating film is first formed on the surface of the second roll 12, then, the mixture coating material 22 in the coating film state is transferred from the second roll 12 to the coated object 21 which is moving on an upper surface of a third roll 13.

A roll rotation direction of the third roll 13 is inverse to the roll rotation direction of the second roll 12.

The coated object 21 is moved between the second roll 12 and the third roll 13 at a velocity equal to a roll peripheral velocity of the third roll 13 along the roll rotation direction of the third roll 13.

In order to obtain a better transfer property, the roll rotation direction and the roll peripheral velocity of the first roll 11 and the second roll 12 which are adjacent to each other may be different from each other as well as the roll rotation direction and the roll peripheral velocity of the second roll 12 and the third roll 13 which are adjacent to each other may be different from each other.

It may also be preferable that further another roll is provided between the second roll 12 and the third roll 13 according to need.

In order to transfer the mixture coating material 22 in the coating film state from the first roll 11 to the second roll 12 as well as in order to transfer the mixture coating material 22 in the coating film state from the second roll 12 to the coated material 21, the surfaces of the first roll 11 and the second roll 12 are preferably covered with materials with an excellent transfer property and so on.

Other materials besides the above-described materials may be used as long as such materials have an excellent transfer property.

Then, surface treatments by (1) thermal spraying processing, (2) impregnated coating of fluororesin, silicone resin and so on or (3) plating and so on may be performed.

Furthermore, the above materials and the surface treatments can be used by itself as well as can be used by mixing or combining them according to need.

In order to transfer the mixture coating material 22 in the coating film state from the first roll 11 to the second roll 12 as well as in order to transfer the mixture coating material 22 in the coating film state from the second roll 12 to the coated material 21, the surfaces of the first roll 11 and the second roll 12 are preferably roughened.

In the case where the surfaces of the first roll 11 and the second roll 12 are roughened, the contact area between the mixture coating material 22 and the surfaces of the first roll 11 and the second roll 12 tends to be reduced and the adhesion of the mixture coating material 22 to the surfaces of the first roll 11 and the second roll 12 is reduced as compared with the case where the surfaces of the first roll 11 and the second roll 12 are not roughened, therefore, the mixture coating material 22 hardly remains on the surfaces of the first roll 11 and the second roll 12.

For example, in order to transfer almost all the coating film from the first roll 11 to the second roll 12 as well as in order to transfer almost all the coating film from the second roll 12 to the coated object 21, the degree of surface roughening on the surfaces of the first roll 11 and the second roll 12 is preferably adjusted so that the contact area between the coating material to be used and the surfaces of the first roll 11 and the second roll 12 is smaller than the contact area in the case of the mirror surface in which an arithmetic average roughness Ra on the roll surface is 0.05 µm or less.

Though the contact area between the mixture coating material 22 and the surfaces of the first roll 11 and the second roll 12 tends to be small when the surfaces of the first roll 11 and the second roll 12 are roughened as described above, the contact area may be increased when the degree of surface roughening is increased too much.

This is because the coating material bites into depressions on the surfaces of the first roll 11 and the second roll 12 when the degree of surface roughening is increased too much.

The point that it is effective to adjust the degree of surface roughening is the same as described above.

Incidentally, when the mixture coating material 22 enters the gap between the first roll 11 and the second roll 12 as well as the gap between the second roll 12 and the third roll 13 uniformly with respect to the roll axis direction, the uniform coating film product 23 with small variation in film thickness with respect to the roll axis direction can be obtained.

However, as the gap size between the second roll 12 and the third roll. 13 is reduced particularly in a place where the coated object 21 exists in the roll central portion with respect to the roll axis direction, the coating material tends to flow to roll end portions at outer sides in the above-described third state (refer to FIG. 3). Accordingly, the rate of entry of the material in the roll central portion tends to be smaller than the rate of entry of the material in the roll end portions.

Therefore, in order to allow the rate of entry of the material to be uniform with respect to the roll axis direction, it is preferable that the degree of surface roughening in the roll end portions is larger than the degree of surface roughening in the roll central portion by changing the roughness on the roll surfaces in the first roll 11 and the second roll 12 with respect to the roll axis direction so that the material hardly enters the roll end portions.

That is, when the arithmetic average roughness Ra at arbitrary one point on the roll surface is smaller than the arithmetic average roughness Ra at another arbitrary point on the roll surface existing at an outer side of the one arbitrary point with respect to the roll axis direction, preferable effects can be obtained.

Needless to say, when the arithmetic average roughness Ra at arbitrary one point on the roll surface within a given range in accordance with a width of the coated object 21 is smaller than the arithmetic average roughness Ra at another arbitrary point on the roll surface outside the given range, sufficient effects can be obtained in many cases.

In the degree of surface roughening, it is preferable that the component of the roll circumferential direction is smaller than the component of the roll axis direction.

When the component of the roll circumferential direction is small, the entry property of the material is increased, and when the component of the roll axis direction is large, the movement of the material with respect to the roll axis direction is suppressed and the entry variation of the material with respect to the roll axis direction is reduced, therefore, it is possible to transfer the coating film from the first roll 11 to the second roll 12 as well as from the second roll 12 to the coated object 21 more easily.

Naturally, the coating may be performed in both surfaces at the same time by using the combination of the roll pair including the first roll 11 and the second roll 12 as described above as shown in FIG. 7 as well as may be performed in plural layers successively or at the same time.

Figure 7:
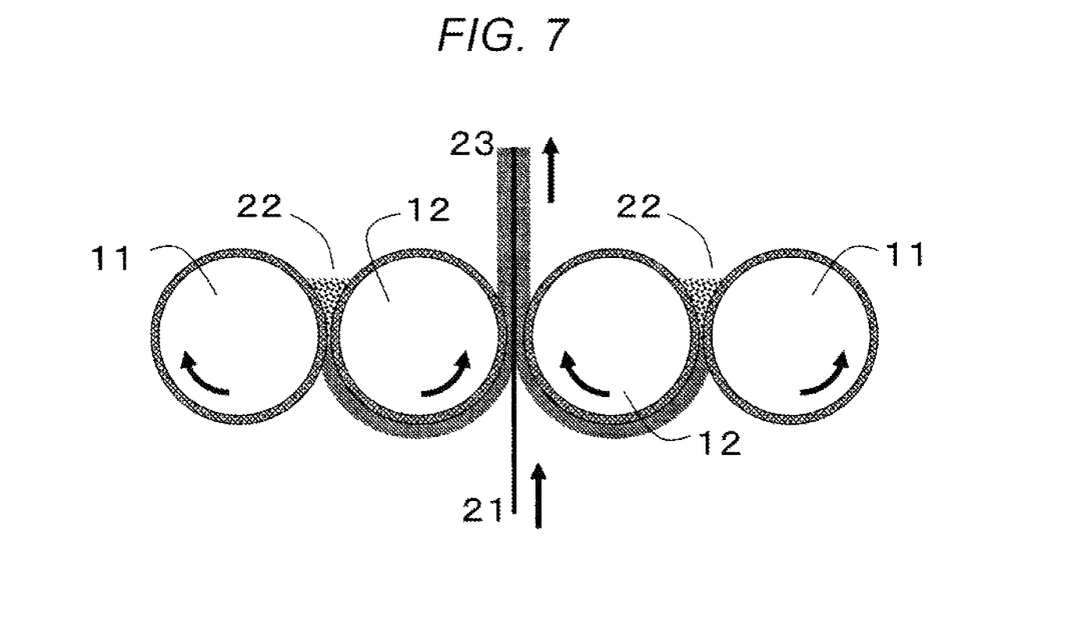
FIG. 7 is a schematic partial cross-sectional view of a manufacturing apparatus of the coating film product according to further another exemplary embodiment.

Here, FIG. 7 is a schematic partial cross-sectional view of a manufacturing apparatus of the coating film product 23 according to further another embodiment.

As described above, the mixture coating material 22 is supplied to the gap between the first roll 11 and the second roll 12, and the mixture coating material 22 is transferred in the coating film state onto the coated object 21 to thereby form the coating film product 23.

Then, the coating film product 23 goes through various states from a state just after the mixture coating material 22 is transferred onto the coated object 21 to post-processes such as the pressing process, the drying process and the peeling process.

In the embodiments, the above coating film product 23 is an example of the coating film product, the mixture coating material 22 is an example of the coating film material and the coated object 21 is an example of the coated object.

The first roll 11 (refer to FIG. 2 and FIG. 6) and the second roll 12 (refer to FIG. 6) are examples of the rolls according to the embodiments.

In the case where plural rolls used for transferring the coating material to the adjacent roll or to the coated object are provided, sufficient effects can be obtained in many cases as long as the adjustment of various parameters including the degree of surface roughening described above is performed with respect to at least one of the plural rolls.

Hereinafter, examples and comparative examples according to the embodiment based on experiments executed by present inventors will be explained in detail.

Example 1

The fabrication of a negative electrode plate of a lithium ion secondary battery will be explained in detail.

First, a negative-electrode mixture coating material will be explained.

That is, artificial graphite with 100 pts. volume as an active substance of the negative electrode, styrene-butadiene copolymer rubber particle dispersion with 2.3 pts. volume in terms of solid content of a binding agent with respect to the active substance of 100 pts. volume as the binding agent and carboxymethyl cellulose with 1.4 pts. volume with respect to the active substance of 100 pts. volume as a thickener were stirred with a given amount of water by using a double-arm kneading machine, thereby fabricating a negative-electrode mixture coating material having a volume water content of 50%.

As mean particle sizes of primary particles of the negative-electrode mixture coating material, d10 was 1 μm, d50 was 3 μm and d90 was 8 μm.

Particles which are considered as ultimate particles by measure of a geometric form in appearance are primary particles, and the primary particles in this case are mainly particles of artificial graphite. Such primary particles are an example of particles included in the coating film material according to the present embodiment.

Next, rolls used for fabricating the negative electrode plate will be explained.

The first roll 11, the second roll 12 and the third roll 13 were installed in parallel to one another so that gaps between rolls concerning adjacent rolls were respectively 100 μm (refer to FIG. 6).

A material of the first roll 11, the second roll 12 and the third roll 13 was SUS, and hard chromium plating processing was performed on these surfaces of the rolls.

The roll surfaces of the first roll 11 and the second roll 12 were roughened by blasting, and covered with a DLC film.

Then, the water contact angle of the roll surface before being roughened was 110 degrees.

Concerning the roughness in the roll central portions in the first roll 11 and the second roll 12 as positions where the coated object travels, the surface roughening was performed so that Ra was 1 μm and RSm was 30 μm.

The surface roughening was performed so that (Ra in the roll central portion)/(Ra in the roll end portions) was smaller than "1".

Furthermore, the surface roughening was performed so that (Ra in the roll circumferential direction)/(Ra in the roll axis direction) was smaller than "1" to have directionality with respect to the roll circumferential direction and the roll axis direction.

The coated object 21 traveling between the second roll 12 and the third roll 13 at a velocity equal to the roll peripheral velocity of the third roll 13 was a copper foil with a thickness of 15 μm.

The roll peripheral velocity of the second roll 12 was set to 30 m/minute and the roll peripheral velocity of the third roll 13 was set to 45 m/minute as well as the roll peripheral velocity of the first roll 11 was set so that (the roll peripheral velocity of the second roll 12)/(the roll peripheral velocity of the first roll 11) was 5.

Then, the fabricated negative-electrode mixture coating material was supplied between the first roll 11 and the second roll 12, the coating film was formed on the surface of the second roll 12 once and transferred from the second roll 12 to the coated object 21 as the copper foil, then, a solvent was volatilized in the drying process, compression and molding were performed in the pressing process to fabricate the negative electrode plate.

The negative electrode plate was evaluated concerning the coating-film transfer property, the entry property of the material between rolls and the film thickness variation in the roll axis direction as described below.

Concerning the coating-film transfer property, whether the mixture coating material 22 was transferred in the coating film state to the coated object 21 moving on the upper surface of the third roll 13 from the first roll 11 through the second roll 12 in good condition or not was measured. Evaluation was performed in four stages in order of excellence, which were denoted by A, B and C indicating transfer properties in which there is no problem at least in practical use, and denoted by D indicating a transfer property in which there are problems in practical use.

Concerning entry property of the material between rolls, whether the mixture coating material 22 entered uniformly in right and left directions between the first roll 11 and the second roll 11 without being spilled right and left or not was measured.

Concerning the film thickness variation in the roll axis direction, whether the film thickness of the fabricated coating film with respect to the roll axis direction varies or not was measured.

Note that Examples 2 to 9 and Comparative Examples 1, 2 differ from Example 1 in conditions concerning fabrication of the negative electrode plate as described below.

Example 2

Concerning the roughness in the roll central portions in the first roll 11 and the second roll 12 as positions where the coated object travels, the surface roughening was performed so that Ra was 0.5 μm and RSm was 12 μm.

Example 3

Concerning the roughness in the roll central portions in the first roll 11 and the second roll 12 as positions where the coated object travels, the surface roughening was performed so that Ra was 2 μm and RSm was 100 μm.

Example 4

The surface roughening was performed so that (Ra in the roll central portion)/(Ra in the roll end portions) was 1.05.

Example 5

The surface roughening was performed so that (Ra in the roll circumferential direction)/(Ra in the roll axis direction) was 1.5.

Example 6

The roll peripheral velocity of the first roll 11 was set so that (roll peripheral velocity of the second roll 12)/(roll peripheral velocity of the first roll 11) was smaller than "1".

Example 7

A negative-electrode mixture coating material with a volume water content of 15% was fabricated.

Example 8

A negative-electrode mixture coating material with a volume water content of 80% was fabricated.

Example 9

Concerning the roll surfaces of the first roll 11 and the second roll 12, the surface roughening was performed only by blasting without performing the hard chromium plating processing, and the surfaces were not covered with the DLC film.

The water contact angle on the roll surfaces before being roughened was 80 degrees.

Comparative Example 1

Concerning the roughness in the roll central portions in the first roll 11 and the second roll 12 as positions where the coated object travels, the surface roughening was performed so that Ra was 0.01 μm and RSm was 8 μm.

Comparative Example 2

Concerning the roughness in the roll central portions in the first roll 11 and the second roll 12 as positions where the coated object travels, the surface roughening was performed so that Ra was 0.0 μm and RSm was 150 μm.

Here, experimental results obtained by Examples 1 to 9 and Comparative Examples 1, 2 are shown in Table 1.

TABLE 1

| Item | roll central position Ra | roll central position RSm | (roll central portion Ra)/ (roll end portion Ra) | (roll circumferential direction Ra)/ (roll axis direction Ra) | volume water content of coating material | material of roll surfaces | water contact angle of roll surfaces | (second roll peripheral velocity)/ (first roll peripheral velocity) | coating film transfer property | material entry property between rolls | Film thickness variation in roll axis direction |
|---|---|---|---|---|---|---|---|---|---|---|---|
| Example 1 | 1 μm | 30 μm | <1 | <1 | 50% | DLC | 110 degrees | 5 | A | uniform | 2 μm or less |
| Example 2 | 0.5 μm | 12 μm | <1 | <1 | 50% | DLC | 110 degrees | 5 | A | uniform | 2 μm or less |

TABLE 1-continued

| Item | roll central position Ra | roll central position RSm | (roll central portion Ra)/ (roll end portion Ra) | (roll circumferential direction Ra)/ (roll axis direction Ra) | volume water content of coating material | material of roll surfaces | water contact angle of roll surfaces | (second roll peripheral velocity)/ (first roll peripheral velocity) | coating film transfer property | material entry property between rolls | Film thickness variation in roll axis direction |
|---|---|---|---|---|---|---|---|---|---|---|---|
| Example 3 | 2 μm | 100 μm | <1 | <1 | 50% | DLC | 110 degrees | 5 | A | uniform | 2 μm or less |
| Example 4 | 1 μm | 30 μm | 1.05 | <1 | 50% | DLC | 110 degrees | 5 | A | spilled right and left | 5 μm |
| Example 5 | 1 μm | 30 μm | <1 | 1.5 | 50% | DLC | 110 degrees | 5 | B | nonuniform | 10 μm |
| Example 6 | 1 μm | 30 μm | <1 | <1 | 50% | DLC | 110 degrees | <1 | B | uniform | 2 μm or less |
| Example 7 | 1 μm | 30 μm | <1 | <1 | 15% | DLC | 110 degrees | 5 | C | — | — |
| Example 8 | 1 μm | 30 μm | <1 | <1 | 80% | DLC | 110 degrees | 5 | C | — | — |
| Example 9 | 1 μm | 30 μm | <1 | <1 | 50% | SUS | 80 degrees | 5 | C | — | — |
| Comparative Example 1 | 0.01 μm | 8 μm | <1 | <1 | 50% | DLC | 110 degrees | 5 | D | uniform | 2 μm or less |
| Comparative Example 2 | 10 μm | 150 μm | <1 | <1 | 50% | DLC | 110 degrees | 5 | D | uniform | 2 μm or less |

In Examples 1 to 9, $$d10\times 0.05 < Ra < d90\times 20, \text{ and} \quad \text{(Expression 1)}$$

$$RSm < d90\times 15 \quad \text{(Expression 2)}$$

are satisfied, therefore, transfer properties with no problem at least in practical use were obtained.

In Examples 1 to 3, not only the transfer property is good but also the entry property of the material is good and uniform also in the roll axis direction, and film thickness variation in the roll axis direction and so on is small as the roughening has been performed so that (Ra in the roll central portion)/(Ra in the roll end portion) is smaller than "1" and (Ra in the roll circumferential direction)/(Ra in the roll axis direction) is smaller than "1".

In Comparative Example 1, (Expression 1) is not satisfied and the state on the roll surfaces is close to the mirror-surface state, therefore, the transfer property from at least the second roll 12 to the coated object 21 is worse, and the mixture coating material 22 remains at least on the second roll 12.

In Comparative Example 2, (Expression 2) is not satisfied, therefore, the transfer property from at least the second roll 12 to the coated object 21 is worse, and the mixture coating material 22 remains at least on the second roll 12.

In Example 4, as (Ra in the roll central portion)/(Ra in the roll end portion) is larger than "1", the mixture coating material 22 tends to be spilled from the roll end portions to some degree, therefore, the entry property of the material is slightly nonuniform with respect to the roll axis direction, and the film thickness variation with respect to the roll axis direction and so on were slightly increased.

Note that the roll central portion is, for example, a portion inside positions which are approximately 10 mm outside from both ends of the coated object 21 in the width direction and the roll end portions are portions outside the positions which are approximately 10 mm outside from both ends of the coated object 21 in the width direction.

In Example 5, (Ra in the roll circumferential direction)/ (Ra in the roll axis direction) is larger than "1", the transfer property from the second roll 12 to the coated object 21 is rather worse, some of the mixture coating material 22 remains on the second roll 12, the entry property of the material is slightly nonuniform with respect to the roll axis direction and the film thickness variation with respect to the roll axis direction and so on are slightly increased.

As one of the reasons why desirable effects can be obtained when (Ra in the roll circumferential direction)/(Ra in the roll axis direction) is smaller than "1", it is possible to cite a fact that the coating film is easily peeled off in a travelling direction of the coating film.

In Example 6, as (the roll peripheral velocity of the second roll 12)/(the roll peripheral velocity of the first roll 11) is smaller than "1", the transfer property from the second roll 12 to the coated object 21 is rather worse and some of the mixture coating material 22 remains on the second roll 12.

As one of the reasons why desirable effects can be obtained when (the roll peripheral velocity of the second roll 12)/(the roll peripheral velocity of the first roll 11) is larger than "1", it is possible to cite a fact that the transfer can be easily performed in many cases even when a coating material having difficulty in transferring is used.

As one of the reasons why desirable effects can be obtained when roll rotation directions of adjacent rolls are different from each other, it is possible to cite a fact that pressure can be uniformly applied to the coating film in many cases.

In Embodiment 7, as the negative-electrode mixture coating material with the volume water content lower than 20 volume % was fabricated, the transfer property from the second roll 12 to the coated object 21 is worse and the mixture coating material 22 remains on the second roll 12.

In Embodiment 8, as the negative-electrode mixture coating material with the volume water content upper than 65 volume was fabricated, the transfer property from the second roll 12 to the coated object 21 is worse and the mixture coating material 22 remains on the second roll 12.

As one of the reasons why desirable effects can be obtained when the volume water content of the mixture coating material 22 is 20 volume % or more to 65 volume % or less, it is possible to cite a fact that favorable adhesion of the coating film can be easily obtained in many cases.

In Embodiment 9, as the water contact angle on the roll surfaces before being roughened was lower than 90 degrees, the transfer from the second roll 12 to the coated object 21 is worse and the mixture coating material 22 remains on the second roll 12.

As one of the reasons why desirable effects can be obtained when the water contact angle on the roll surfaces before being roughened is 90 degrees or more, it is possible to cite a fact that a high releasing property of the mixture coating material 22 can be easily obtained in many cases.

As described above, in Embodiments 7 to 9, (Expression 1) and (Expression 2) are satisfied, however, the volume water content of the mixture coating material 22 is not in the range of 20 volume % or more to 65 volume % or less, the water contact angle on the roll surfaces before being roughened is not 90 degrees or more, therefore, the transfer property of the coating film is not extremely good and it is difficult to evaluate the material entry property between rolls and film thickness variation in the roll axis direction.

Next, a structure of a lithium ion secondary battery according to the embodiment and a manufacturing method of the lithium ion secondary battery according to the embodiment will be explained with reference to FIG. 8.

Figure 8:
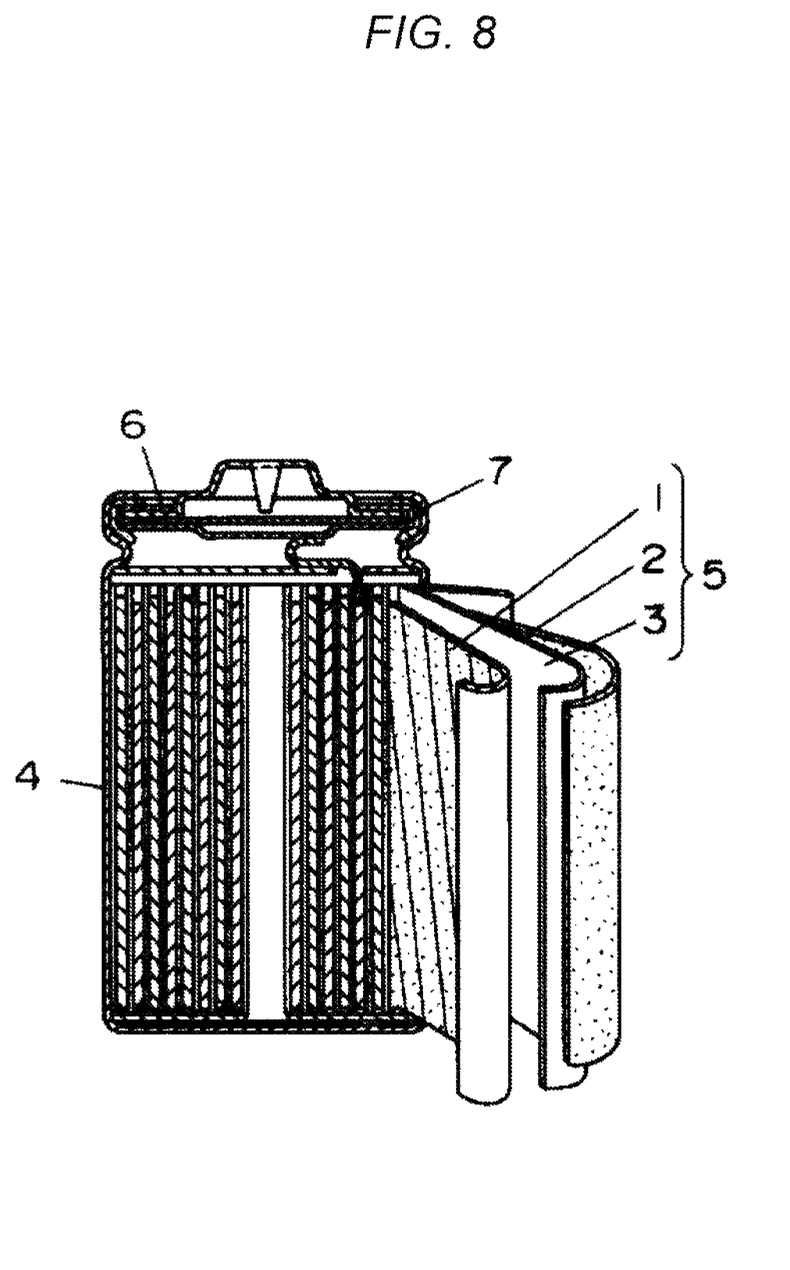
FIG. 8 is a partially-cutaway schematic perspective view of a lithium ion secondary battery according to an exemplary embodiment.

Here, FIG. 8 is a partially-cutaway schematic perspective view of the lithium ion secondary battery according to the embodiment.

In the perspective views, a longitudinal section of the lithium ion secondary battery having a cylindrical shape is schematically shown by using a partial cutaway.

A negative electrode plate 2 is a negative electrode plate fabricated as described above.

In the assembly of the lithium ion secondary battery, a spiral-shaped electrode plate group 5 winding a positive-electrode plate 1 using a composite lithium oxide as an active substance, the negative electrode plate 2 using a material which can hold lithium as an active substance in a spiral shape through a separator 3 is housed inside a battery case 4 having a bottomed cylindrical shape, and an electrolyte including a given amount of nonaqueous solvent is injected, then, a sealing plate 6 to which a gasket 7 is attached to a rim is inserted into an opening of the battery case 4 and the opening of the battery case 4 is folded in an inner direction to seal the case.

The lithium ion secondary battery according to the embodiment which uses the electrode plates with small film-thickness variation has excellent output characteristics, and is useful as a power supply for which high output is required.

Therefore, the lithium ion secondary battery according to the embodiment can be used to various apparatuses which require the power supply, which are, for example, (1) electronic apparatuses such as a personal computer, a cellular phone device, a smart phone, a digital still camera, a television and a video camera, (2) electric tools such as an electric drill and a motor screw driver, (3) moving bodies including vehicles such as a wheel chair, a bicycle, a scooter, a motorcycle, a motorcar, an assistive vehicle, electric trains and trains, and (4) a power storage system as a power supply for emergencies.

Needless to say, the manufacturing apparatus of the coating film product 23 according to the embodiment can be used for manufacturing not only secondary batteries such as the lithium ion secondary battery but also resin films for, for example, a capacitor, a ferrite sheet and a water softener or for other functional resin films.

It should be noted that the rolls 11, 12, 13, unwind machine 15 and wind machine 16 of the various embodiments may be rotated by one or more conventional motors, and one or more control devices may be configured according to software or hardware to control the rotation velocities and rotation directions of each of the rolls 11, 12, 13, as well as the unwind machine 15 and wind machine 16. Further, the one or more control devices can control the coating material supply hopper 17 for supplying the mixture coating material 22.

Accordingly, it is possible to form the electrode composition layer directly onto the current collector by a roll-to-roll process, and it is possible to form the uniform coating film product also when using a wet coating material not requiring the drying process of the coating material, which realizes the manufacturing apparatus of the coating film product having high productivity.

Accordingly, a manufacturing apparatus of the coating film product can realize mass production of the uniform coating film product with higher production efficiency, which is useful to be applied for, for example, the manufacturing apparatus of the coating film product for manufacturing the coating film product by transferring the coating film material to the coated object which is allowed to continuously travel.

What is claimed is:

1. A manufacturing apparatus of a coating film product, comprising:
a coating material supply hopper for supplying a coating film material including particles and having a volume water content of 20 volume % or more to 65 volume % or less; and
first and second rolls adjacent to each other, wherein the first and second rolls are configured to roll the coating film material and transfer the coating film material to a coated object to thereby manufacture the coating film product,
wherein an arithmetic average roughness on a roll surface of the first roll is higher than a value 0.05 times 1 μm as well as smaller than a value 20 times 8 μm,
wherein an arithmetic average roughness Ra at a central portion on the first roll surface is smaller than an arithmetic average roughness at an end portion, and
roll rotation directions of the first and second rolls differ from each other.

* * * * *